United States Patent
Bloomfield et al.

[11] 3,972,731
[45] Aug. 3, 1976

[54] PRESSURIZED FUEL CELL POWER PLANT

[75] Inventors: David P. Bloomfield; Ronald Cohen, both of West Hartford, Conn.

[73] Assignee: United Technologies Corporation, Hartford, Conn.

[22] Filed: Feb. 12, 1975

[21] Appl. No.: 549,600

[52] U.S. Cl. ............................. 136/86 R; 136/86 C
[51] Int. Cl.[2] ......................................... H01M 8/06
[58] Field of Search ............. 136/86 R, 86 A, 86 B, 136/86 C

[56] References Cited
UNITED STATES PATENTS

| | | | |
|---|---|---|---|
| 668,838 | 2/1901 | Lavison | 136/86 A |
| 1,182,759 | 5/1916 | Emanuel | 136/86 R |
| 3,112,229 | 11/1963 | Bacon et al. | 136/86 R |
| 3,311,097 | 3/1967 | Mittelstaedt | 123/119 |
| 3,404,529 | 10/1968 | Lagerstrom | 60/6 |
| 3,507,702 | 4/1970 | Sanderson | 136/86 R |
| 3,615,850 | 10/1971 | Chludzenski | 136/86 C |

*Primary Examiner*—John H. Mack
*Assistant Examiner*—H. A. Feeley
*Attorney, Agent, or Firm*—Stephen E. Revis

[57] ABSTRACT

A fuel cell power plant for producing electricity uses pressurized reactants in the cells. The air is compressed by compressor apparatus which is powered by waste energy produced by the power plant in the form of a hot pressurized gaseous medium, such as the exhaust gases from the cathode side of the cells. For example, the compressor apparatus may comprise a compressor and a turbine which are operably connected. The exhaust gases from the cathode side of the cell are delivered into the turbine which drives the compressor for compressing the air delivered to the cells.

19 Claims, 4 Drawing Figures

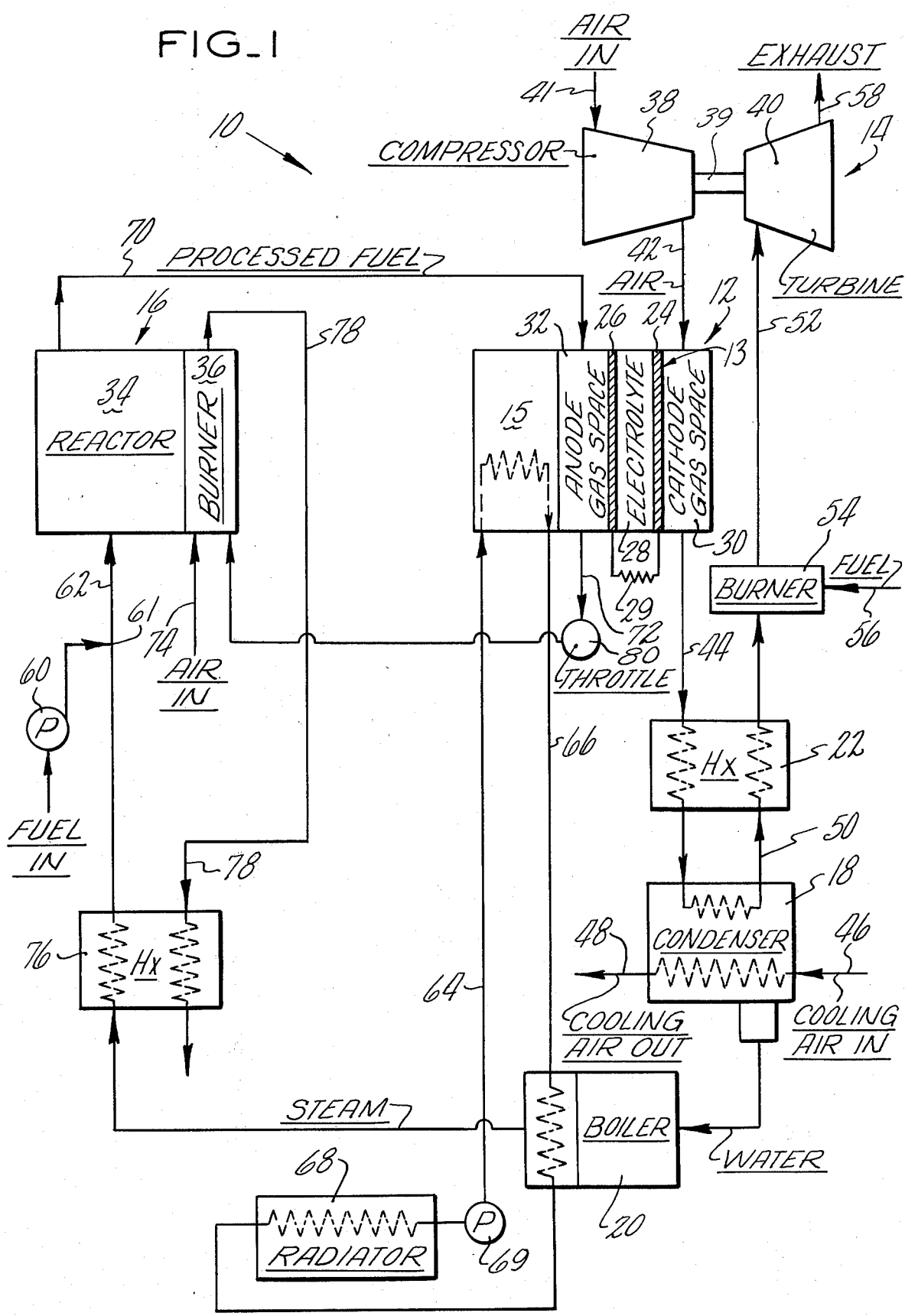
FIG_1

FIG._2
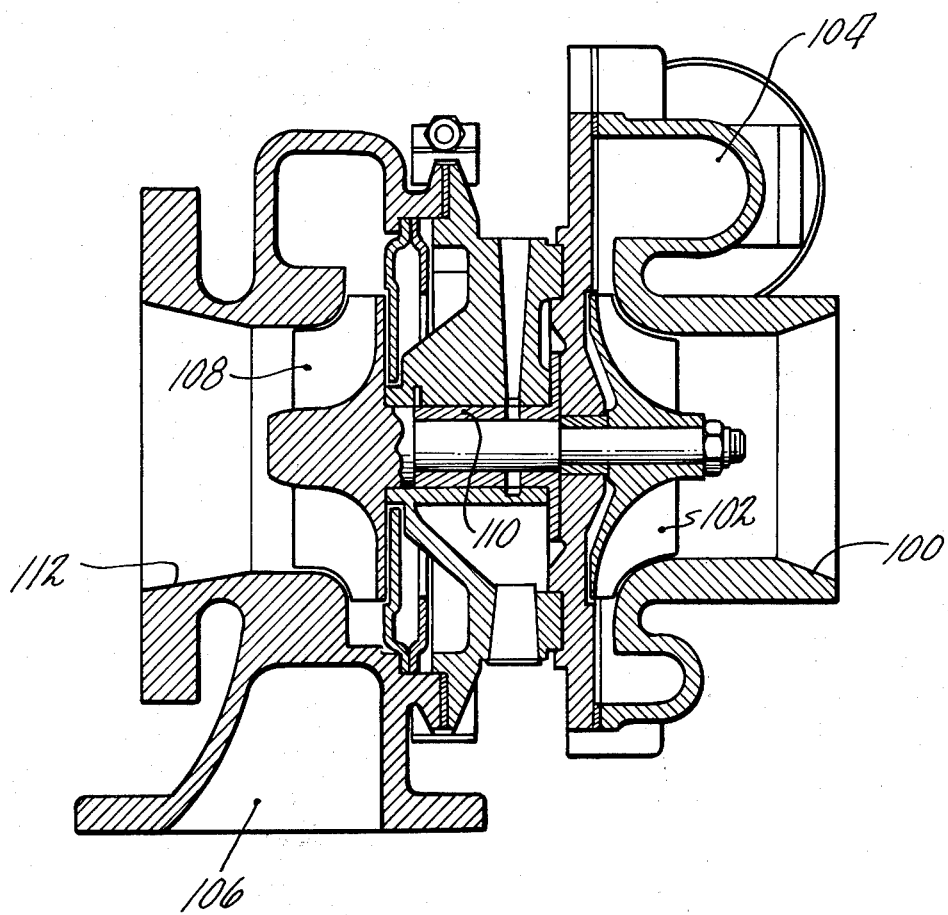

PRESSURIZED FUEL CELL POWER PLANT

BACKGROUND OF THE INVENTION

1. Field of the Invention

This invention relates to power plants and more particularly to electricity producing power plants utilizing fuel cells as the power source.

2. Description of the Prior Art

In the fuel cell art there have been three general approaches to improving fuel cell performance. One approach is to increase the temperature at which the fuel cell operates. This approach, however, is limited by material corrosion and, in acid electrolyte cells, by acid evaporation. A second approach is to attempt to increase the amount of catalyst per square inch of electrode surface area. This approach, however, is limited by the increased expense and practical limitations in the amount of catalyst that can be possibly be put on a certain area of electrode. A third approach is to increase the pressure of the reactants within the fuel cell. It is well known in the art that fuel cells perform better as reactant pressures increase. One of the major stumbling blocks to this approach is that it requires cnsiderable energy to pressurize the reactants. It has been considered, for example, that the energy to pressurize reactants should be the electrical energy produced by the fuel cell; that electrical energy would be used to drive a compressor. The problem is that it takes about 30% of the electrical output of the cell stack to drive a compressor to produce a reasonable reactant pressure. This means that the fuel cell would have to be increased in size by about 50% to make up for the loss of usable electrical power. Since a fuel cell stack is itself the most expensive component of a fuel cell power plant, the increase in performance is offset by the increased cost due to increased cell size. Because total electrical power output of the cell stack is increased, other components of the power plant will have to be increased proportionately such as the condensing apparatus and the fuel conditioning apparatus. This further increases size and cost of the power plant. Further, other apparent disadvantages in the power plant system utilizing high pressure reactants are the cost of additional equipment to pressurize the reactants, the necessity for more expensive sealing arrangements, and the additional cost due to the necessity of utilizing stronger components to contain the higher pressures. In view of the foregoing considerations, with regard to power plants utilizing air as the oxidant, it has always been considered that no net advantage could be achieved, and most likely, there would be a net disadvantage in going to power plants utilizing high pressure reactants in the fuel cell stack. For the foregoing reasons, up to the present time, these fuel cell power plants have always used reactants at atmospheric pressures.

RELATED APPLICATIONS

The following applications, filed on even date herewith and of common assignee, pertain to subject matter related to the present invention:

1. "Pressurized Fuel Cell Power Plant" by D. Bloomfield, U.S. Ser. No. 549,601
2. "Pressurized Fuel Cell Power Plant With Air Bypass" by M. Landau, U.S. Ser. No. 549,598
3. "Pressurized Fuel Cell Power Plant With Steam Flow Through The Cells" by D. Bloomfield and M. Landau, U.S. Ser. No. 549,596
4. "Pressurized Fuel Cell Power Plant" by M. Menard, U.S. Ser. No. 549,597
5. "Pressurized Fuel Cell Power Plant With Single Reactant Gas Stream" by D. Bloomfield, U.S. Ser. No. 549,602
6. "Pressurized Fuel Cell Power Plant With Steam Powered Compressor" by D. Bloomfield, U.S. Ser. No. 549,599

SUMMARY OF THE INVENTION

One object of the present invention is an economically attractive fuel cell power plant that operates on pressurized reactants.

Another object of the present invention is a more efficient fuel cell power plant.

A further object of the present invention is a fuel cell power plant which, when compared to a prior art fuel cell power plant of similar capacity, is smaller in size and has lower overall hardware costs.

Accordingly, the present invention is an electricity generating power plant using fuel cells wherein the oxidant is supplied to the fuel cells at high pressure from compressor apparatus which is driven by waste energy produced by the power plant. In one embodiment of the present invention both air and fuel are supplied to the cells at high pressure, and the energy in the cathode gas stream effluent is used to drive a turbine which in turn runs a compressor for pressurizing the oxidant stream to the cathode.

Since the electrical energy output from the cell stack is not used to pressurize the air, there is no need to increase the size of the fuel cell stack in order to maintain power plant capacity. As a matter of fact, full advantage can be taken of the performance improvement in the fuel cell stack such that the stack may produce even more electrical energy without an increase in its size.

Furthermore, other heretofore unrecognized benefits arise throughout the power plant to further enhance the attractiveness of a fuel cell power plant designed according to the present invention. For example, one advantage of the present invention is that it permits a reduction in the size of the water recovery or condensing apparatus of the power plant by a factor of about two or three. This is particularly significant since the water recovery apparatus of prior art fuel cell power plants occupies a volume about as large as the fuel cell stack and fuel conditioning apparatus combined.

Another advantage of the present invention is that it permits a reduction in the size of the steam reforming reactor (i.e., part of the fuel conditioning apparatus) of the power plant by a factor of about two as compared to the steam reforming reactor used in a prior art fuel cell power plant of similar capacity.

The foregoing and other objects, features and advantages of the present invention will be more fully explained and will become more apparent in the light of the following detailed description of preferred embodiments thereof as illustrated in the accompanying drawing.

BRIEF DESCRIPTION OF THE DRAWING

FIG. 1 is a schematic representation of a power plant according to the present invention.

FIG. 2 is a cross-sectional view of a turbocharger which may be used in power plants of the present invention.

DESCRIPTION OF THE PREFERRED EMBODIMENTS

Figure 4:
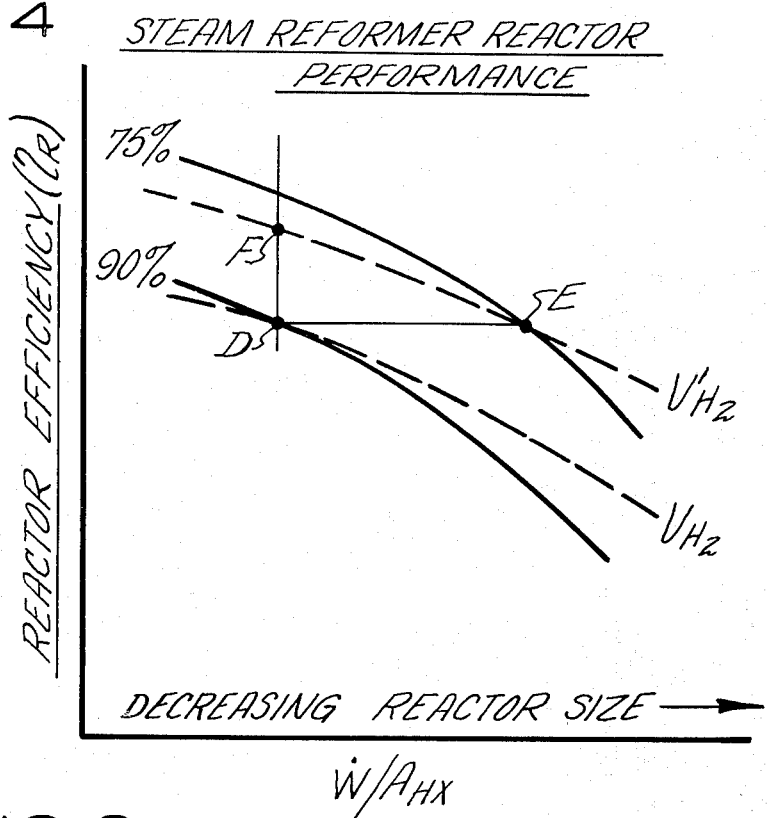
FIG. 4 is a graph illustrating the performance of steam reforming reactors used in power plants of the present invention.

Consider, as an exemplary embodiment of the present invention, the power plant depicted schematically in FIG. 1. The power plant is generally designated by the numeral 10 and includes a fuel cell stack generally designated by the numeral 12, compressor apparatus generally designated by the numeral 14, fuel conditioning apparatus generally designated by the numeral 16, a condenser 18, a boiler 20, and a regenerator 22. The fuel cell stack 12 may comprise any conventional type of fuel cells which operate on gaseous reactants. In this embodiment the oxidant is air and the fuel is hydrogen, but this is by way of example only and other oxidants and fuels may be used. The stack 12 will generally comprise a plurality of fuel cells connected in series electrically through a load, but is herein depicted as only comprising a single cell 13 for the purpose of clarity and a thermal management portion 15. As herein shown each cell includes a cathode electrode 24 spaced from an anode electrode 26 and including an electrolyte retaining matrix 28 therebetween. In this preferred embodiment the electrolyte is liquid phosphoric acid but the invention is not intended to be limited thereto and both acid and base electrolytes as well as solid types of electrolytes such as metal oxide electrolytes or solid polymer electrolytes are contemplated as being useful in a power plant designed according to the present invention. The electrodes 24, 26 are connected in series through a load 29. Each cell 13 also includes a cathode gas space 30 on the nonelectrolyte side of the cathode electrode 24 and an anode gas space 32 on the nonelectrolyte side of the anode electrode 26. In this embodiment the fuel conditioning apparatus 16 comprises a steam reformer reactor 34 and a reactor burner 36. The compressor apparatus 14 is a turbocharger comprising a compressor 38 driven by an exhaust turbine 40 through a shaft 39 and will be described hereinafter in more detail as will other components of the power plant 10.

Still referring to FIG. 1, in operation air enters the compressor 38 via a conduit 41, and is compressed. Any pressure greater than atmospheric pressure will yield some benefits as compared to unpressurized power plants; however, about two or higher atmospheres of pressure are desirable in order that substantial benefits are realized for the total power plant. This pressurized air enters the cathode gas space 30 via a conduit 42 and is electrochemically reacted within the cathode electrode 24 with the phosphoric acid electrolyte in the matrix 28 to produce electricity and water, some of the water being evaporated back into the air stream flowing through the cathode gas space 30. The moist hot, cathode effluent leaves the gas space 30 via a conduit 44 and passes through the regenerator 22 and thence through the condenser 18. Cooling air enters the condenser 18 via a conduit 46 and leaves in a heated condition via a conduit 48. Within the condenser 18 the cathode effluent is cooled to the point where water condenses out and is collected for use in the fuel conditioning apparatus 16 as will be hereinafter discussed. The relatively cool cathode effluent leaves the condenser via a conduit 50 and passes through the regenerator 22 where it recovers some of its lost heat. The reheated cathode effluent is carried from the regenerator into the turbine 40 via a conduit 52, and provides the energy to power the turbine 40 which in turn drives the compressor 38. If necessary, an auxiliary burner 54 may be utilized to further boost the energy of the cathode exhaust stream after it leaves the regenerator 22. In this embodiment the burner 54 is a catalytic burner. Fuel enters the auxiliary burner 54 via a conduit 56 as necessary. After passing through the turbine 40 any further energy in the cathode effluent gas stream may be either thrown away via conduit 58 or may be used elsewhere in the power plant.

On the anode side, a hydrogen containing liquid fuel such as naphtha, which has been increased in pressure by a pump 60 to about the same pressure as the air entering the cathode gas space 30, is mixed with steam at 61 from the boiler 20 and enters the team reforming reactor 34 via a conduit 62. Although not shown, it is preferable that the fuel be atomized as it is combined with the steam at 62 so that the stream entering the reactor 34 is in the vapor state.

The boiler 20 may be provided with its own burner and fuel supply if desired, but as herein shown in this preferred embodiment the boiler 20 is run on waste heat produced by the stack 12. As shown, a coolant, such as a silicon oil, enters the thermal management portion 15 of the stack 12 via a conduit 64, picks up heat generated by the stack 12 and leaves via a conduit 66. Water from the condenser 18 is introduced into the boiler 20 via a conduit 67. The coolant fluid enters the boiler 20 and gives up its heat to the water in the boiler to produce steam. The coolant fluid leaves the boiler 20 and enters a radiator 68 where additional heat may be rejected before the coolant is pumped back to the stack by a pump 69.

Processed fuel in the form of hydrogen gas and possibly some impurities leaves the steam reforming reactor 34 by means of a conduit 70 whereupon it enters the anode gas space 32 of the fuel cell 13 where it electrochemically reacts with the electrolyte. In this embodiment the anode gas stream is contemplated as being at about the same pressure as the cathode gas stream in order to minimize the risk of gas crossover between the anode and cathode gas spaces. The anode effluent gas stream leaves the anode gas space 32 by means of a conduit 72 and passes through the burner 36 along with air via a conduit 74 to provide the heat for the steam reforming reactor. The reactor burner effluent may be exhausted to atmosphere or, as shown in this embodiment, may be passed through a regenerator 76 via a conduit 78 wherein its heat is used to superheat the steam leaving the boiler 20. The reactor burner 36 may be a high pressure burner or a low pressure burner. In this embodiment a low pressure burner is used to eliminate the need for compressing the air supply to the burner. This means that the high pressure anode gas stream effluent in the conduit 72 must be reduced to atmospheric pressure before entering the reactor burner 36. A throttle 80 is provided for that purpose.

Although in this embodiment the water for the reactor 34 is supplied by condensing out water from the cathode effluent gas stream, it may be that the power plant is situated near a supply of water such as a river, lake or large water tank. If that is the case then it would be possible to eliminate the water recovery apparatus and to supply the reactor with water from these other sources. This would also eliminate the need for the regenerator 22.

Although the fuel conditioning apparatus is shown comprising only a steam reforming reactor and reactor burner, it is contemplated that the fuel conditioning apparatus of power plants designed according to the present invention may include other components such as a shift converter and/or a selective oxidizer. The requirements of the fuel conditioning apparatus are dependent in part upon the type of raw fuel being used and upon the particular design of the cells in the fuel cell stack. Indeed, the fuel conditioning apparatus may include a partial oxidation hydrogen generator instead of a steam reforming reactor and reactor burner.

As an example of a turbocharger suitable for use in a power plant designed according to the present invention, consider the turbocharger shown in FIG. 2. Ambient air enters a compressor duct 100 and impinges upon a single stage centrifugal impeller 102 which imparts a velocity head to the air. The high velocity air flows into a diffuser 104 where the velocity head is changed to a pressure head. In the embodiment of FIG. 1 the compressed air would leave the diffuser 104 via the conduit 42 and thereupon be introduced into the cathode gas space 30. Hot gases enter a turbine inlet 106 (such as from the conduit 52 in FIG. 1) and flow through a centrifugal turbine rotor 108 which converts the thermal energy of the gas stream to shaft horsepower to drive a shaft 110 connected to the compressor inpeller 102. The gases are exhausted via a turbine outlet duct 112.

The turbocharger pictured in FIG. 2 is only illustrative of the type of device preferred for use in the power plants of the present invention. Any commercially available turbocharger of a size sufficient to provide the required flow rate and pressure needed by the fuel cell stack chosen for use in the power plant may be used. For example, for a 1200 kilowatt power plant wherein it is desired that the reactant gases to the fuel cell stack are to be at about 3.5 atmospheres pressure, a Brown Boveri model RR150 turbocharger would be suitable. This particular model has the capability of providing a mass flow rate of up to 3.0 lb/sec at 50 psia. Although the term "turbocharger" is usually associated with a centrifugal compressor, as used herein it is intended to encompass an axial flow compressor as well. Centrifugal compressors are preferred because they have the advantage of high efficiency and high single-stage compression ratios not usually available with axial flow compressors. Also, although the turbocharger of FIG. 2 shows a centrifugal turbine, it is also contemplated that turbochargers using axial flow turbines may be used in power plants of the present invention.

Although what is pictured in FIG. 2 is representative of what is typically referred to in the art as a turbocharger the present invention is not intended to be limited thereto but may be any apparatus which uses the energy of a hot pressurized gas stream (typically exhaust gases) to compress another gas. For example, any heat engine capable of driving a compressor and which itself may be powered by a hot pressurized gas stream may be used. Also, a Comprex (registered trademark of Brown Boveri & Company, Ltd., Bade, Switzerland) supercharger which compresses air by direct transmission of energy from an expanding gas utilizing compression and expansion waves, or other device which works on similar principles, may be used.

The Comprex supercharging concept is well known in the art and is more fully described in an ASME paper No. 58-GTP-16 titled "The Comprex . . . A New Concept of Diesel Supercharging" by Max Berchtold and F. J. Gardiner published in March 1958.

Figure 3:
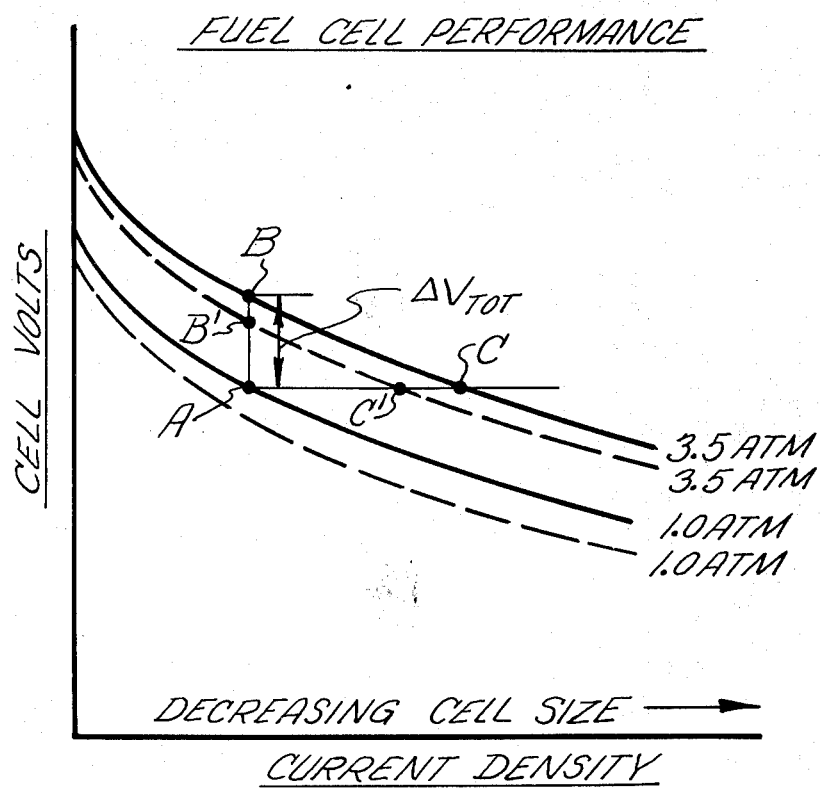
FIG. 3 is a graph illustrating the performance of fuel cells used in power plants of the present invention.

In order to more fully appreciate and understand the advantages and operation of the present invention consider the graph of FIG. 3 which may be used to compare the performance of a fuel cell using reactants at atmospheric pressure to the performance of the same fuel cell using, for example, reactants at about 3.5 atmospheres of total pressure. There are several variables which must be taken into consideration when making comparisons between cells. Reactant utilization is the weight flow rate of reactants at either the anode or the cathode which is consumed in the cell by the electrochemical reaction divided by the weight flow rate of hydrogen or oxygen, respectively, into the cell. In a fuel cell operating on oxygen and hydrogen there is thus oxygen utilization ($U_{O_2}$) at the cathode and hydrogen utilization ($U_{O_2}$) at the anode. Raising reactant utilization automatically lowers the partial pressure of the reactants seen by the anode and the cathode since more reactants are taken out of the gas stream per pound of mass flow through the cell; thus, the average amount of reactant in the gas stream over the surface of the electrode is less from the inlet to the outlet. The curve labeled 1.0 atmosphere in FIG. 3 represents cell performance at a particular hydrogen utilization and oxygen utilization. The solid curve labeled 3.5 atmospheres represents cell performance at the same reactant utilizations. Also, the cells represented by each of these curves is assumed to be operating at the same temperature. The well known Tafel equation states that there will be an increase in cathode performance (i.e., an increase in voltage) when the partial pressure of oxygen increases. This equation is set forth below.

$$\Delta V_{cathode} = K(\text{mv}) \log \frac{P_{O_2}}{P_{O_2(\text{ref})}} \quad (1)$$

where $K$ is a constant. The Nernst equation states that there will be an increase in anode performance (i.e., an increase in cell voltage) when the partial pressure of hydrogen is increased. The Nernst equation is set forth below.

$$\Delta V_{anode} = C(\text{mv}) \ln \frac{P_{H_2}}{P_{H_2 \text{ ref}}} \quad (2)$$

where $C$ is a constant. It is apparent that for constant temperature and for constant utilization, an increase in the total pressure of the reactants results in an increase in the partial pressure of both reactants leading to an improvement in both cathode and anode performance. The total improvement in fuel cell performance may be simply stated as follows:

$$\Delta V_{total} = \Delta V_{cathode} + \Delta V_{anode} \quad (3)$$

The left hand side of equation (3) is illustrated by the graph of FIG. 3 as the difference in voltage between points A and B at constant current density. Further, from the graph of FIG. 3, it can be seen that by operating at reactant pressures of 3.5 atmospheres the cell size may be decreased without decreasing the cell voltage output such as by operating at point C.

The dotted curves on the graph of FIG. 3 are also representative of cell performance at 1.0 and 3.5 atmospheres of reactant pressure, respectively, as labeled. These curves represent the performance of cells similar in all respects to cells represented by the solid curves except that the cells have been designed for higher reactant utilization. Note that at 3.5 atmospheres the cell can run at a higher reactant utilization and still show improvement over the prior art such as an increase in cell voltage by operating at point B' or an increase in current density (i.e., a decrease in cell size) for the same cell voltage by operating at point C'. On the other hand, notice that for a cell using reactants at atmospheric pressure an increase in utilization means either increasing the size of the cell to maintain the same cell voltage or taking a voltage loss in order to maintain the same cell size. The importance of the ability to operate at higher hydrogen utilization without sacrificing performance or increasing the size of the cell will become apparent in the hereinafter set forth discussion relating to the operation of the steam reformer reactor 34 of the power plant of the preferred embodiment.

In prior art phosphoric acid electrolyte fuel cells operating over 300°F and at atmospheric pressures evaporation of the phosphoric acid electrolyte occurs. The effect of acid evaporation is to require that acid be added regularly during the lifetime of the power plant. Acid evaporation is a function of the mass flow rate of air through the cathode gas space, the partial pressure of acid, and the total gas pressure in the cathode gas space according to the following relationship:

$$\text{Acid loss} = f \left\{ \text{flow rate} \times \frac{\text{vapor pressure of acid}}{\text{total pressure}} \right\} \quad (4)$$

From the foregoing formula it is apparent that increasing the total pressure of the gases flowing through the cathode gas space reduces acid loss. It is also a fact that increasing the total pressure results in a decrease in the vapor pressure of the acid due to dilution of the electrolyte, further reducing acid loss. Also, due to the higher reactant pressures fuel cells incorporated in power plants of the present invention may be run at higher oxygen utilizations, and therefore the flow rate of air through the cathode gas space is lower and acid loss is further reduced. It has been determined that the foregoing factors combined reduce acid loss by an order of magnitude.

A graph representative of a steam reformer reactor performance is shown in FIG. 4. Reformer efficiency ($\eta_R$) is plotted on the vertical axis and the flow rate of the processed gas stream ($\dot{W}$) divided by the heat transfer area of the reactor ($A_{hx}$) is plotted on the horizontal axis. Since the term $A_{hx}$ is directly related to the size of the reactor, reformer size decreases when moving to the right along the horizontal axis. Reformer efficiency is defined by the following equation:

$$\eta_R = (K) U_{H_2}(\alpha\beta) \quad (5)$$

where $K$ is a constant, $U_{H_2}$ is hydrogen utilization in the fuel cell, and the product ($\alpha\beta$) is fuel conversion in the reactor. Fuel conversion ($\alpha\beta$) is the percent of carbon in the incoming fuel which is converted to $CO_2$. It is representative of the amount of hydrogen produced in the steam reforming reaction. Shown in the graph of FIG. 4 are 90% and 75% fuel conversion curves along with a hydrogen utilization curve labeled $U_{H_2}$ and a hydrogen utilization curve labeled $U'_{H_2}$, the latter representing a higher hydrogen utilization. For the purposes of comparison assume that $U_{H_2}$ is the same hydrogen utilization as represented by the solid curves in FIG. 3 and that $U'_{H_2}$ is the hydrogen utilization represented by the dotted curves of FIG. 3. As discussed with reference to FIG. 3, fuel cells using reactants at atmospheric pressure were constrained to operate at a particular hydrogen utilization $U_{H_2}$ in order to achieve a certain cell voltage for a particular cell size (i.e., such as operating at point A). Having chosen a particular hydrogen utilization it is thus required that the operation of the steam reformer reactor must be somewhere along the hydrogen utilization curve $U_{H_2}$. It is thus a matter of choosing the best combination of reformer efficiency and reformer size for the particular cell. Generally, in order to keep reformer size within reasonable limits, fuel conversion in prior art reactors is commonly around 90%. This would put the operation of the steam reformer reactor used with prior art fuel cells at point D. It now becomes clear why it is so important to be able to run the fuel cell at a higher hydrogen utilization. For example, in a power plant designed according to the present invention it is now possible to operate along the curve $U'_{H_2}$. This permits the use of a smaller steam reformer reactor without sacrificing efficiency because the reformer can be run at a lower fuel conversion. This operating point is labeled E in FIG. 4. Of course, if desired, reactor size can be kept the same and reformer efficiency can be greatly improved such as by operating at point F. It is important to note that although there is some loss in fuel cell performance when operating at higher reactant utilizations (see FIG. 3) the fuel cell performance picture is still greatly improved; and, in addition, significant improvements can also be realized in the steam reformer reactor. This is contrary to prior art power plants wherein although a higher reactant utilization in the fuel cell could result in benefits for the steam reformer reactor, these benefits are offset by the detrimental effect on fuel cell performance.

With regard to designing a power plant according to the present invention, it will, of course, be necessary to trade off between seeking improvements in reactor performance and seeking improvements in fuel cell performance. Thus, the reactant utilization, cell size, cell output voltage, reactor size, reactor efficiency, and reactor fuel conversion rate are chosen depending upon the particular goals of the power plant being designed.

In the preferred embodiment it is contemplated that naphtha will be used as the fuel and that the steam reformer reactor 34 will be of the well known type which utilizes a nickel catalyst. The reactor could, however, be any conventional apparatus for generating hydrogen. For example, although less efficient than a steam reforming reactor, a partial oxidation hydrogen generator may be used and will benefit significantly by the higher reactant gas pressures. In certain instances fuel conditioning apparatus may not even be required, such as if pure hydrogen is available for use as fuel for the stack.

With regard to power plants designed according to the present invention, a condenser considerably smaller than the condensers of prior art fuel cell power plants may be used. At a constant current there is a constant amount of water produced by the fuel cell according to Faraday's law. This water leaves the cell in the cathode effluent gas stream. The steam reforming reaction is known to require a certain amount of water which, in the prior art, as in the preferred embodiment of the present invention, is obtained at least in part from the cathode gas stream. This water is removed from the cathode gas stream by a condenser. In prior art phosphoric acid electrolyte power plants wherein the gas stream is at atmospheric pressure the dew point of the stream is so low that in order to condense out a sufficient amount of water to run the steam reformer reaction the temperature of the gas stream leaving the condenser must necessarily be only a few degrees higher than the ambient cooling air. Accordingly, very large condensers are required. As heretofore stated the condensers are the largest components of prior art fuel cell power plants. In pressurized power plants according to the invention the dew point of the gas stream leaving the cathode gas space will be considerably higher than in the prior art due to the higher pressure of the gas stream. For example, the dew point of a gas stream leaving 300°F stack at 45 psia would be about 60°F higher than the dew point of a gas stream leaving a 300°F stack at atmospheric pressure. This means that to condense out the same amount of water the temperature of the gas stream need not be reduced to as low a level as in unpressurized systems. In other words there will be significant difference between the temperature of the condenser cooling air and the temperature of the gas stream leaving the condenser. Assuming the pressurized and unpressurized systems both use 90°F cooling air, it is estimated that the condenser size may be reduced by a factor of about two or three. This reduction in size of the condenser equipment is one of the major advantages of the present invention and helps to significantly reduce the cost of the power plant.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. In the process for generating electricity in a power plant comprising a compressor operably connected to a turbine, reactor means, and a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode, the steps of:
   compressing air to greater than two atmospheres in said compressor;
   delivering said compressed air at greater than two atmospheres from said compressor into said cathode gas space;
   delivering a pressurized hydrogen containing fuel into said reactor means;
   producing hydrogen in said reactor means;
   delivering pressurized hydrogen from said reactor means into said anode gas space;
   burning anode effluent gases to provide heat for said step of producing hydrogen; and
   adding energy to said pressurized cathode effluent gases downstream of said cathode gas space and thereafter delivering said pressurized cathode effluent gases into said turbine for powering said turbine to drive said compressor.

2. The process according to claim 1 including the step of condensing water out of said cathode effluent gases prior to the step of delivering said cathode effluent gases into said turbine.

3. The process according to claim 2 including the step of converting the water condensed from said cathode effluent gases to pressurized steam and wherein said step of delivering pressurized fuel into said reactor means includes delivering said pressurized steam into said reactor means.

4. The process according to claim 3 wherein said step of converting said water to steam includes converting said water to steam using heat produced in said fuel cell stack.

5. The process according to claim 2 including reducing the temperature of said cathode effluent gases in a regenerative heat exchanger prior to said step of condensing and reheating said cathode effluent gases in said regenerative heat exchanger after said step of condensing.

6. The process according to claim 5 wherein said step of adding energy to said effluent gases is done after said step of reheating said gases.

7. The process according to claim 1 wherein said power plant includes a source of water including the steps of converting said water to pressurized steam and delivering said pressurized steam to said reactor means, and said step of producing hydrogen includes steam reforming said fuel.

8. The process according to claim 1 wherein said step of adding energy to said cathode effluent gases includes burning additional fuel in an auxiliary burner.

9. A power plant for generating electricity comprising:
   a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
   compressor means comprising a compressor and a turbine, said turbine being operably connected to said compressor;
   fuel conditioning apparatus including reactor means for producing hydrogen from a hydrogen containing fuel;
   burner means for providing heat to said reactor means;
   means for delivering air at a pressure of at least two atmospheres from said compressor means into said cathode gas space;
   means for delivering pressurized hydrogen containing fuel into said reactor means;
   means for delivering pressurized hydrogen from said fuel conditioning apparatus into said anode gas space;
   means for delivering anode effluent gases into said burner means for providing fuel to said burner means; and means for delivering pressurized effluent gases from said cathode gas space into said turbine for powering said turbine and driving said compressor including means disposed upstream of said turbine and downstream of said cathode gas space for adding energy to said cathode effluent gases.

10. The power plant according to claim 9 wherein said electrolyte is an acid electrolyte.

11. The power plant according to claim 9 wherein said electrolyte is phosphoric acid.

12. The power plant according to claim 9 including a source of water and means for converting said water to pressurized steam, wherein said reactor means for producing hydrogen from a hydrogen containing fuel is a reactor means for producing hydrogen from a hydrogen containing fuel and steam, said power plant including means for delivering said pressurized steam into said reactor means.

13. The power plant according to claim 12 wherein said source of water includes said cathode effluent gases, said power plant including condenser means and means for delivering said cathode effluent gases into said condenser means for removing water therefrom, said power plant also including means for delivering the water condensed out of said cathode effluent gases to said means for converting said water to steam.

14. The power plant according to claim 13 wherein said means for converting water to steam includes means to exchange heat produced in said stack with said water condensed from said cathode effluent gases.

15. The power plant according to claim 9 wherein said reactor means is a steam reinforcing reactor and said burner means is a reactor burner.

16. The power plant according to claim 13 including regenerative heat exchanger means disposed downstream of said cathode gas space for reducing the temperature of the cathode effluent gases before they enter the condenser means and for reheating the cathode effluent gases after they leave the condenser means.

17. The power plant according to claim 16 wherein said means for adding energy to said cathode effluent gases is disposed downstream of said condensing means and downstream of said regenerative heat exchanger means.

18. The power plant according to claim 9 wherein said means for adding energy to said cathode effluent gases is an auxiliary burner, said power plant including means to deliver fuel into said auxiliary burner.

19. A power plant for generating electricity comprising;
a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;
compressor means comprising a compressor and a turbine, said turbine being powerable by the energy of a hot pressurized gaseous medium and operably connected to said compressor;
means for delivering air at a pressure of at least two atmospheres from said compressor into said cathode gas space;
fuel conditioning apparatus including reactor means for reforming fuel to produce hydrogen and reactor burner means in heat exchange relationship to said reactor means for providing heat to said reactor means;
regenerative heat exchanger means and condenser means disposed downstream of said cathode gas space;
means for delivering pressurized cathode effluent gases (1) into said heat exchanger means to reduce the temperature of said gases, (2) from said heat exchanger means into said condenser means to remove water therefrom, and (3) from said condenser means back through said heat exchanger means to reheat said gases;
means to convert the water recovered in said condenser means to pressurized steam using heat from said stack;
means for delivering pressurized fuel and said pressurized steam into said reactor means;
means for delivering pressurized hydrogen from said fuel conditioning apparatus into said anode gas space;
means for delivering anode effluent gases into said burner means for providing fuel to said burner means; and
means for delivering said pressurized cathode effluent gases from said heat exchanger means into said turbine for powering said turbine and driving said compressor including auxiliary burner means disposed upstream of said turbine and downstream of said heat exchanger means for adding heat to said cathode effluent gases.

* * * * *